United States Patent
Sotirov et al.

(10) Patent No.: US 11,711,380 B2
(45) Date of Patent: Jul. 25, 2023

(54) SYSTEMS AND METHODS FOR PARALLEL VIRUS AND MALWARE SCAN BETWEEN AGENTS IN A CLOUD ENVIRONMENT

(71) Applicant: Acronis International GmbH, Schaffhausen (CH)

(72) Inventors: Iliya Sotirov, Sofia (BG); Serguei Beloussov, Costa Del Sol (SG); Stanislav Protasov, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 418 days.

(21) Appl. No.: 17/060,481

(22) Filed: Oct. 1, 2020

(65) Prior Publication Data
US 2021/0120016 A1    Apr. 22, 2021

Related U.S. Application Data

(60) Provisional application No. 62/923,665, filed on Oct. 21, 2019.

(51) Int. Cl.
*H04L 9/40* (2022.01)

(52) U.S. Cl.
CPC ...... *H04L 63/1416* (2013.01); *H04L 63/1441* (2013.01)

(58) Field of Classification Search
CPC ............. H04L 63/1416; H04L 63/1441; H04L 63/145
USPC ......................................................... 726/24
See application file for complete search history.

(56) References Cited

U.S. PATENT DOCUMENTS

| | | | | |
|---|---|---|---|---|
| 7,243,373 B2* | 7/2007 | Muttik | ................. | H04L 63/145 713/188 |
| 7,356,751 B1* | 4/2008 | Levitan | ................. | H04L 1/1685 714/751 |
| 8,042,184 B1* | 10/2011 | Batenin | ................. | H04L 63/145 711/147 |
| 8,230,480 B2* | 7/2012 | Fazal | .................... | H04L 63/145 709/225 |
| 8,544,096 B2* | 9/2013 | Van Brabant | ......... | G06F 21/564 726/24 |
| 9,154,519 B1* | 10/2015 | Godunov | .............. | G06F 21/562 |

(Continued)

FOREIGN PATENT DOCUMENTS

WO   WO-2008147737 A2 *  12/2008 ........... G06F 21/562

*Primary Examiner* — Badri Champakesan
(74) *Attorney, Agent, or Firm* — ArentFoxSchiff LLP; Michael Fainberg (57) ABSTRACT

Disclosed herein are systems and methods for parallel malware scanning in a cloud environment. In one exemplary aspect, a method may comprise identifying a plurality of agents connected to a server, wherein each agent is configured to synchronize data between a different computing device and the server. The method may comprise receiving, from a first agent of the plurality of agents, a request to scan the synchronized data for malware. In response to determining, from the plurality of agents, at least one other agent that comprises the synchronized data, the method may comprise partitioning the synchronized data into a plurality of portions. The method may comprise assigning a first portion for scanning to the first agent and at least one other portion for scanning to the at least one other agent, and aggregating scan results from the first agent and the at least one other agent.

18 Claims, 9 Drawing Sheets

(56) References Cited

U.S. PATENT DOCUMENTS

| | | | |
|---|---|---|---|
| 9,398,036 B2* | 7/2016 | Sim | G06F 21/56 |
| 9,600,394 B2* | 3/2017 | Salunke | G06F 11/3608 |
| 9,690,938 B1* | 6/2017 | Saxe | G06N 3/045 |
| 10,185,826 B1* | 1/2019 | Thomas | G06F 21/53 |

* cited by examiner

SYSTEMS AND METHODS FOR PARALLEL VIRUS AND MALWARE SCAN BETWEEN AGENTS IN A CLOUD ENVIRONMENT

CROSS-REFERENCE TO RELATED APPLICATIONS

This application claims the benefit of U.S. Provisional Application No. 62/923,665, filed Oct. 21, 2019, which is herein incorporated by reference.

FIELD OF TECHNOLOGY

The present disclosure relates to the field of data security, and, more specifically, to systems and methods for scanning for malware in cloud connected devices.

BACKGROUND

As the reliance on digital computing has increased, the amount of cybercrimes such as hacking, data theft, and malware attacks, has followed suit. Accordingly, cyber security methods have shifted their focus to tracking malicious software on user devices. Content that is being synced and shared between storage locations is particularly sensitive to infections and malware. To scan the contents of cloud storage for malware, users must use devices where antivirus software is installed and the cloud content is pre-downloaded (e.g., a laptop). However, pre-downloading content is cumbersome and the scanning operation of the antivirus software is limited by the processing power of the device where the scan was triggered. Even if an infection is detected, users must manually scan and disinfect the infected copies of a file from the cloud storage and all of the other user devices connected to the cloud storage.

SUMMARY

To address these shortcomings, the present disclosure describes methods and systems for parallel malware scanning in a cloud environment. Software that can both synchronize the user's cloud content and scan the content for viruses is invaluable for this exact scenario. The fact that in a cloud environment the user's data is copied over multiple devices can be leveraged to improve the performance and the reliability of an anti-virus scan. Furthermore, parallel execution of synchronization and scanning ensures that appropriate preventative/rehabilitating actions can be taken against infections on all copies of the data distributed across the multiple devices.

In one exemplary aspect, a method may comprise identifying a plurality of agents connected to a server, wherein each agent of the plurality of agents is configured to synchronize data between a different computing device and the server. The method may comprise receiving, from a first agent of the plurality of agents, a request to scan an up-to-date version of the synchronized data for malware. In response to determining, from the plurality of agents, at least one other agent that comprises the up-to-date version of the synchronized data, the method may comprise partitioning the synchronized data into a plurality of portions. The method may comprise assigning a first portion for scanning to the first agent and at least one other portion for scanning to the at least one other agent, aggregating scan results from the first agent and the at least one other agent, and transmitting the aggregated scan results to the plurality of agents.

In some aspects, the method may comprise determining that the aggregated scan results indicate a presence of malware on the synchronized data. The method may comprise removing the malware from the synchronized data, and transmitting updated synchronized data to the plurality of agents, wherein the updated synchronized data does not have the malware.

In some aspects, the method for identifying the plurality of agents may comprise detecting requests from at least two agents to establish at least two push notification channels with the server, wherein each channel of the least two push notification channels is established by a respective agent of the at least two agents, storing identifiers of the at least two push notification channels and the at least two agents, and identifying the at least two agents as the plurality of agents.

In some aspects, the method for determining the at least one other agent that comprises the up-to-date version of the synchronized data may comprise determining a first plurality of checksums for files in the synchronized data on the server, wherein the server comprises the up-to-date version of the synchronized data. The method may determine a second plurality of checksums for the files in the synchronized data on the at least one other agent. The method may compare the first plurality of checksums and the second plurality of checksums. In response to determining a match between the first plurality of checksums and the second plurality of checksums based on the comparing, the method may determine that the at least one other agent comprises the up-to-date version of the synchronized data.

In some aspects, the method for determining the at least one other agent that comprises the up-to-date version of the synchronized data may comprise receiving a status identifier from the at least one other agent indicating that the at least one other agent has completed downloading or uploading the synchronized data, and based on the status identifier, determining that the at least one other agent comprises the up-to-date version of the synchronized data.

In some aspects, the at least one other agent comprises a second agent, and the at least one other portion comprises a second portion and a third portion. The method may comprise assigning the second portion for scanning to the second agent, determining which of the first agent and the second agent completes scanning first, and in response to determining that the first agent has completed scanning first, assigning the third portion for scanning to the first agent.

In some aspects, the method may comprise determining an estimated amount of time to complete scanning of the at least one other portion by the at least one other agent. In response to determining that (1) an amount of time taken by the at least one other agent has exceeded the estimated amount and (2) the first agent has completed scanning the first portion, the method may comprise halting scanning by the at least one other agent of the at least one other portion, retrieving incomplete scan results from the at least one other agent, and assigning, to the first agent, a first sub-portion of the at least one other portion that has not been scanned.

In some aspects, the method may comprise assigning, to the second agent, a second sub-portion of the at least one other portion that has not been scanned.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for generating and storing forensics-specific metadata. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
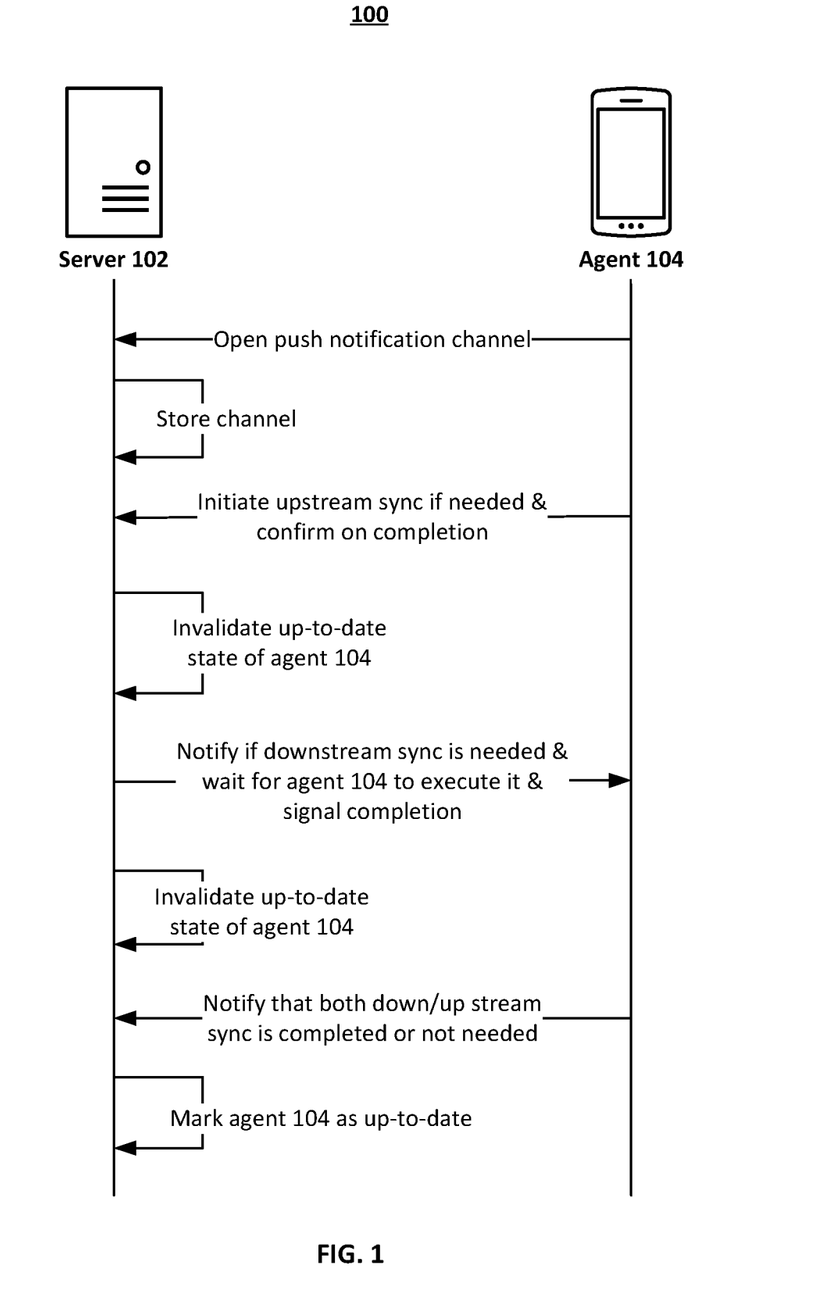
FIG. 1 is a block diagram illustrating a system for determining the up-to-date status of an agent and ensuring correctness of data in a device's sync folder.

FIG. 1 is a block diagram illustrating system 100 for determining the up-to-date status of agent 104 and ensuring correctness of data in a device's sync folder. The system 100 includes server 102 and agent 104. Agent 104 may be a binary running on an operating system of a user device. The user device on which agent 104 is installed may be a personal computer, server, etc., that includes a computer processing unit ("CPU"), and a memory that includes software for performing various tasks (e.g., Operating System (OS) software, application software, etc.). Data for the user device may be stored in the memory of the device itself as well as on other external devices such as server 102, a compact disk, flash drive, optical disk, and the like.

Agent 104 may have a user's credentials and may contact server 102 to establish a connection. Server 102 may establish a connection in response to successfully verifying the user credentials provided by agent 104. Once a connection is established between agent 104 and server 102, using data flow and control flow, the respective entities may be able to exchange files, requests, and operations. The connection between server 102 and the user device comprising agent 104 may be over a network such as the Internet, a mobile phone network, a data network (e.g., a 4G or LTE network), or any combination thereof. For example, server 102 may be part of a cloud computing environment accessed via the Internet, or may be part of a local area network (LAN) with computing device 102. The connection(s) between server 102 and the user device comprising agent 104 may represent communication paths, which may include any combination of free-space connections (e.g., for wireless signals) and physical connections (e.g., fiber-optic cables).

In FIG. 1, agent 104 opens a push notification channel, which is a persistent HTTP channel between agent 104 and server 102. Agent 104 unilaterally opens and closes this connection. Details about this channel are stored by server 102, which maintains a unique channel with each unique agent. It should be noted that a channel may expire after a threshold period of time—particularly if inactive. Once server 102 stores the details about the channel, agent 104 becomes a connected agent (i.e., an agent currently connected to the server).

Agent 104 may then initiate an upstream synchronization with server 102, or may notify server 102 that a downstream synchronization is needed. In the latter case, server 102 waits for the agent to execute the downstream synchronization. In both cases, however, server 102 invalidates the up-to-date status of agent 104. An up-to-date agent has an open channel with server 102, but is not in the process of downloading or uploading content from server 102. Such an agent is classified by server 102 as "at-rest," and is guaranteed by both server 102 and agent 104 to have the correct representation of a user's cloud data. For example, agent 104 may be an up-to-date agent if a sync folder (e.g., the folder on the native agent OS where all of the user's cloud data resides) is fully synchronized between both server 102 and agent 104. Server 102 may mark agent 104 as up-to-date in response to receiving a notification from agent 104 notifying server 102 that both upstream and downstream sync is either completed or not needed.

In an exemplary aspect, agent 104 may include a sub-component that performs virus and malware scanning of the content stored on the user device. Agent 104 also detects and reports whether any given item is infected, suspicious or safe, to server 102. An agent that has finished a scan and is now available to take more work is classified as an idle agent. The change in status of an agent is reported by the agent (e.g., agent 104) to the server (e.g., server 102) along with the result set of the agent's scan work.

Figure 7:
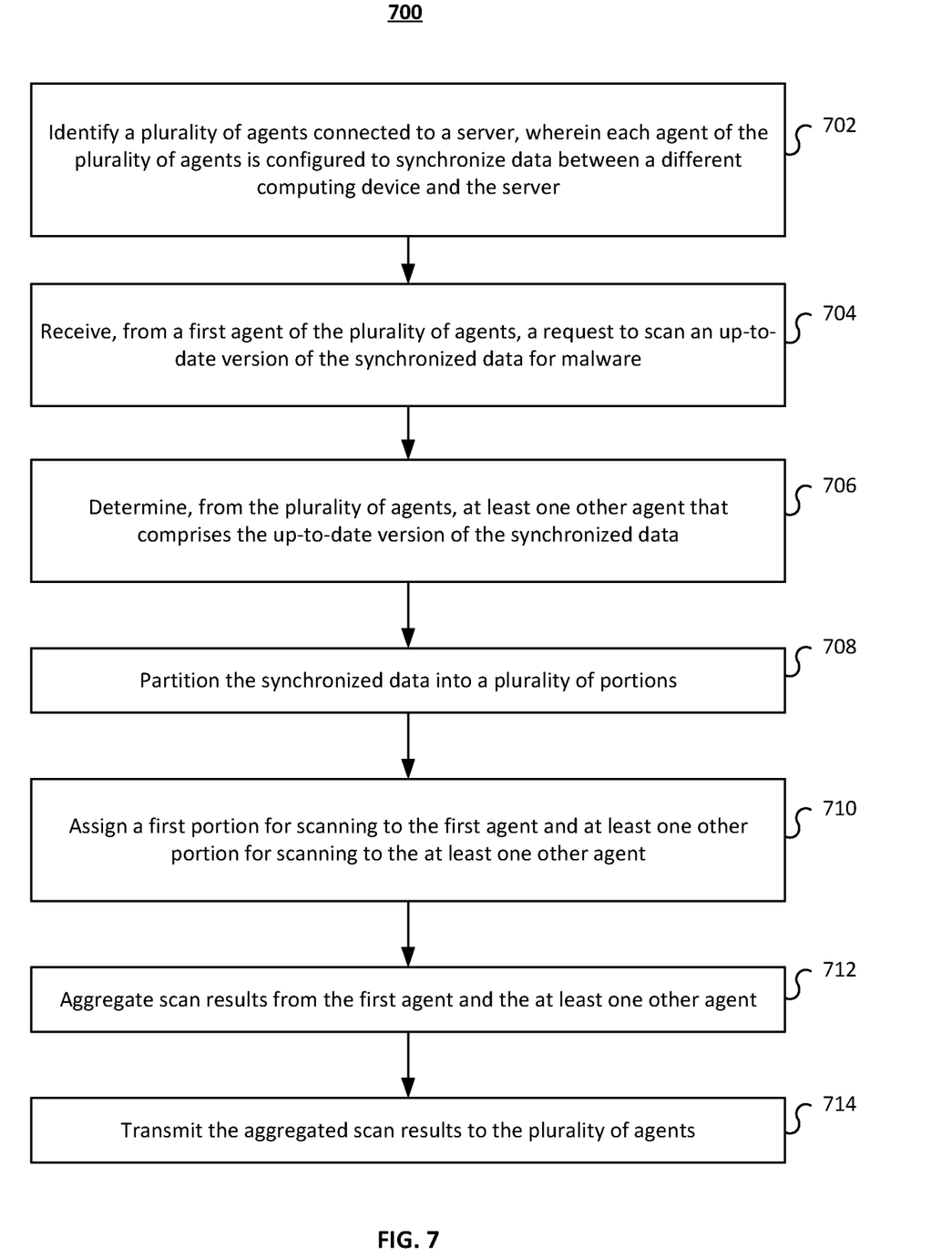
FIG. 7 is a flow diagram illustrating a method for parallel malware scanning in a cloud environment.

In should be noted that there may be more than one server 102, but only one is shown in FIG. 1 to avoid overcomplicating the drawing. For example, server 102 may represent a plurality of servers in a distributed cloud cluster. Server 102 may comprise any number of physical components (e.g., as shown in FIG. 7). For example, server 102 may comprise processors, physical block storage devices (e.g., Hard Disk Drives (HDDs), Solid State Drives (SSDs), flash drives, SMR disks, etc.) or memory (e.g., Random Access Memory (RAM)), I/O interface components, etc.

Figure 2:
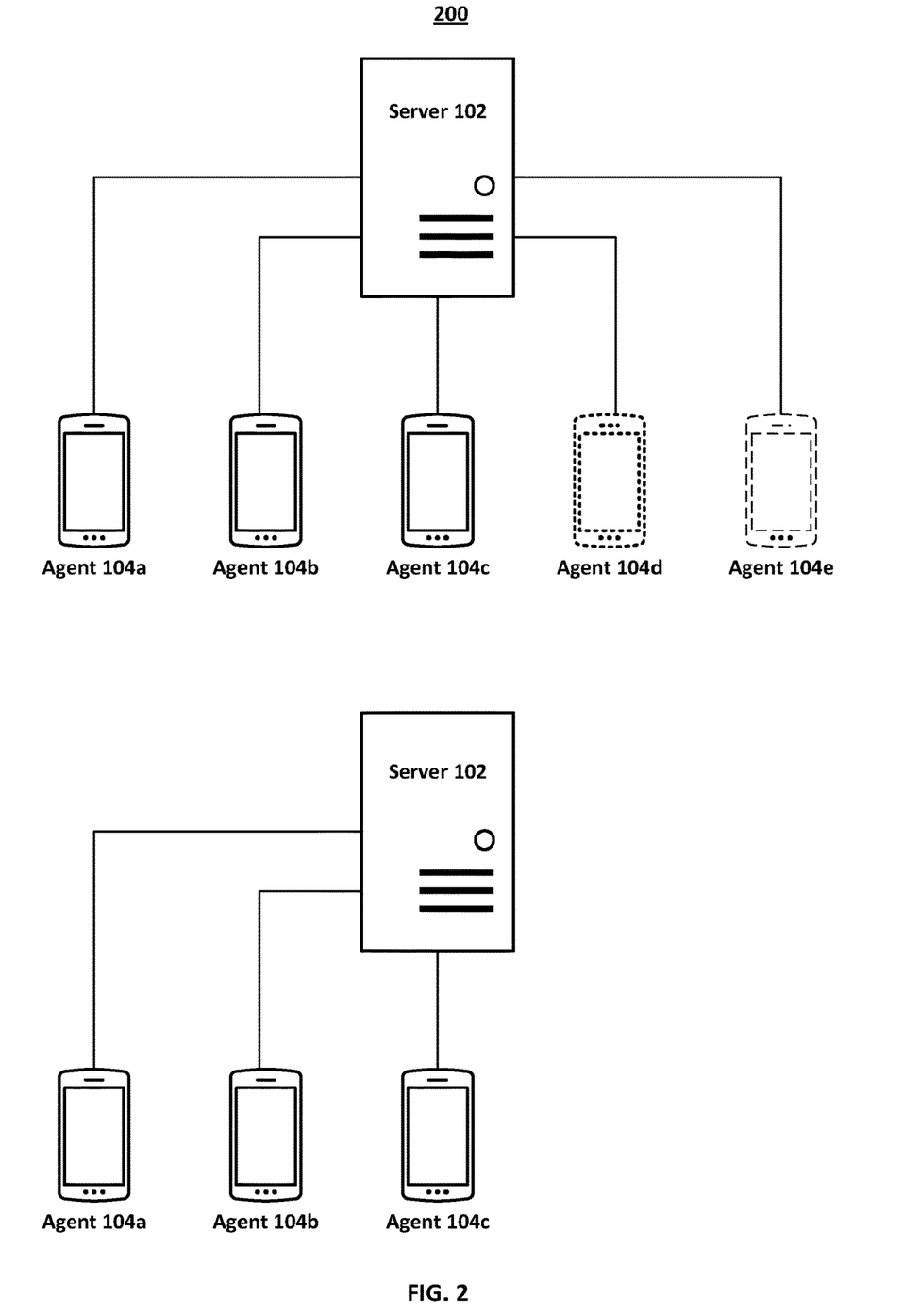
FIG. 2 is a block diagram illustrating a system for selecting agents to include in a scan for malware.

FIG. 2 is a block diagram illustrating system 200 for selecting agents to include in a scan for malware, in accordance with aspects of the present disclosure. Multiple agents may be connected to server 102 (e.g., agent 104a, agent 104c, etc.). The agents in FIG. 2 may each be installed on a different type of user device. For example, agent 104a may be on a laptop and agent 104b may be on a smartphone. Each agent may also have its own anti-virus scanning capabilities. By splitting the workload for scanning amongst all the agents (e.g., thus achieving parallel scanning), the results of the scan can be acquired quickly and efficiently. This is a particular need for cloud environments because data is being uploaded and downloaded very frequently. A file stored on the user device associated with agent 104a may be uploaded to server 102 and may need to be downloaded to all other agents connected to server 102. Agent 104b may receive and immediately modify the file, and thus all other agents will need to re-download the modified copy. The constant data exchange is a hassle to monitor by one device alone. Accordingly, parallel scanning using multiple devices addresses those shortcomings.

To implement parallel scanning, the cloud storage content scanned by any given agent needs to be an exact copy on the other agents. Server 102 may be configured to track this consistency by determining a checksum of every single file that has been uploaded to server 102 by a particular user. The checksum can be generated via any cryptographic hash function. Agent 104a-e may also be configured to determine a checksum of the respective files using the same hash function. This is needed as a guarantee that every single file copied by an agent onto the user's local user device is indeed the correct file from server 102, and has not been changed either during transport or by the OS itself.

In terms of comparing checksums, server 102 may specifically determine a first plurality of checksums for files in the synchronized data on server 102, wherein the server comprises the up-to-date version of the synchronized data. Server 102 may then determine a second plurality of checksums for the files in the synchronized data on at least one agent (e.g., agents 104a-e). Server 102 may compare the first plurality of checksums and the second plurality of checksums, and in response to determining a match between the first plurality of checksums and the second plurality of checksums based on the comparing, determine that the at least one agent comprises the up-to-date version of the synchronized data.

Server 102 may be configured to store a list of all currently connected and reachable agents (i.e., agents that have open push notification channels with server 102). Server 102 may also store a plurality of statuses for every connected agent that designates itself as up-to-date and is not in the process of copying any files to or from server 102. For example, server 102 may detect requests from at least two agents to establish at least two push notification channels with server 102, wherein each channel of the least two push notification channels is established by a respective agent of the at least two agents. Server 102 may store, in memory, identifiers of the at least two push notification channels and the at least two agents, and identify the at least two agents as the plurality of agents.

In an exemplary aspect, server 102 orchestrates the parallel scanning by selecting which agents to include in a parallel scan. In FIG. 2, suppose that agents 104a,b and c are up-to-date agents, agent 104d is a connected agent that is not up-to-date, agent 104e is an offline agent, and agent 104a is the scan-initiator. Server 102 will select only agents 104a-c for parallel scanning because agents 104a-c are up-to-date and have the same content stored on them.

It should be noted that server 102 only selects an agent for parallel scanning if the agent is up-to-date. More specifically, server 102 may receive a status identifier from at least one other agent (different from the agent that requested a scan) indicating that the at least one other agent has completed downloading or uploading the synchronized data. Based on the status identifier, server 102 may determine that the at least one other agent comprises the up-to-date version of the synchronized data.

Furthermore, if an agent ends an established push notification channel, server 102 will exclude the agent from the scan, and its portion to scan will be transferred onto a different agent. If an agent does not report the agent's respective scan result back to server 102 (e.g., within a threshold period of time), server 102 may exclude the agent from the scan and another agent will be assigned with the removed agent's task by server 102. In this case, because the particular agent is very slow, server 102 will intervene, stop the scan on the slow agent, request the partial results list and schedule the remainder of the task to an idle up-to-date agent. This will only occur if such idle agent(s) exist; otherwise, no action will be taken.

Figure 3:
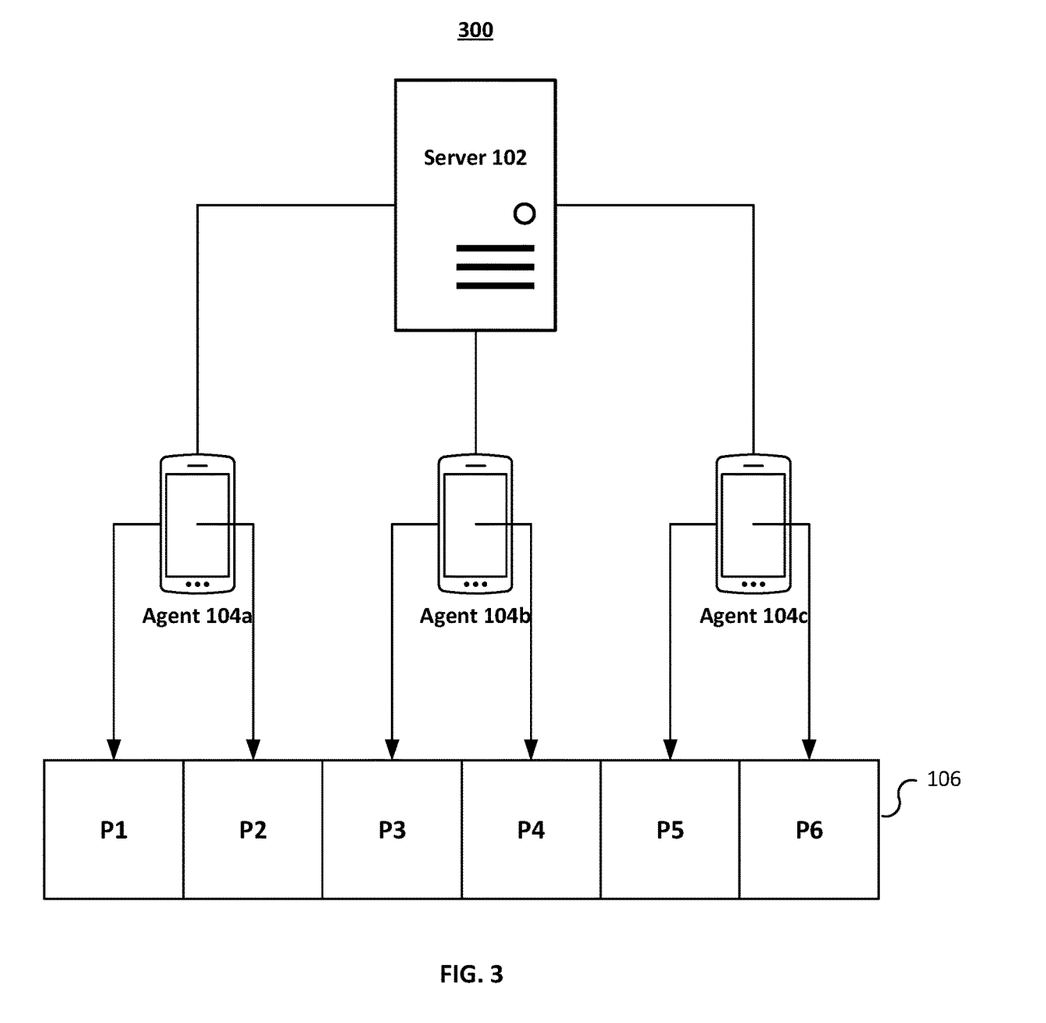
FIG. 3 illustrates a block diagram of a system for assigning portions of a cloud storage to a plurality of agents for scanning purposes.

FIG. 3 illustrates a block diagram of system 300 for assigning portions of a cloud storage to a plurality of agents for scanning purposes, in accordance with aspects of the present disclosure. In FIG. 2, server 102 selected agents 104a-c for performing that parallel scan. Content 106 may represent a sync folder comprising a plurality of files or applications. Content 106 may be split into multiple portions P1-P6. Server 102 may split the workload of scanning for malware and pass assignments to the respective agents. Because the sync folder is identical across all agents, any portion can be passed onto any of the agents. The agents may confirm their assignments and start processing their workload locally. For example, server 102 may assign portion P1 and P2 to agent 104a, P3 and P4 to agent 104b, and P5 and P6 to agent 104c.

In some aspects, server 102 may arbitrarily divide portions equally to each agent (e.g., six portions are divided into three assignments with two portions each).

In some aspects, server 102 may assign portions to a respective agent based on the size of the portion. For example, P1-P4 may each be 2 GB files, P5 may be a 1 GB file and P6 may be a 3 GB file. Server 102 may determine that each agent should be assigned an equal amount of sizes to scan. Accordingly, each agent is assigned 4 GB worth of scanning, wherein agent 104c is assigned the 3 GB file and the 1 GB file (i.e., the largest file and the smallest file).

In some aspects, server 102 may assign larger portions to agents associated with higher processing power. For example, agent 104c may be specifically assigned the 3 GB file because the user device on which agent 104c runs has a higher computing power and/or RAM than agent 104a and agent 104b.

Figure 4:
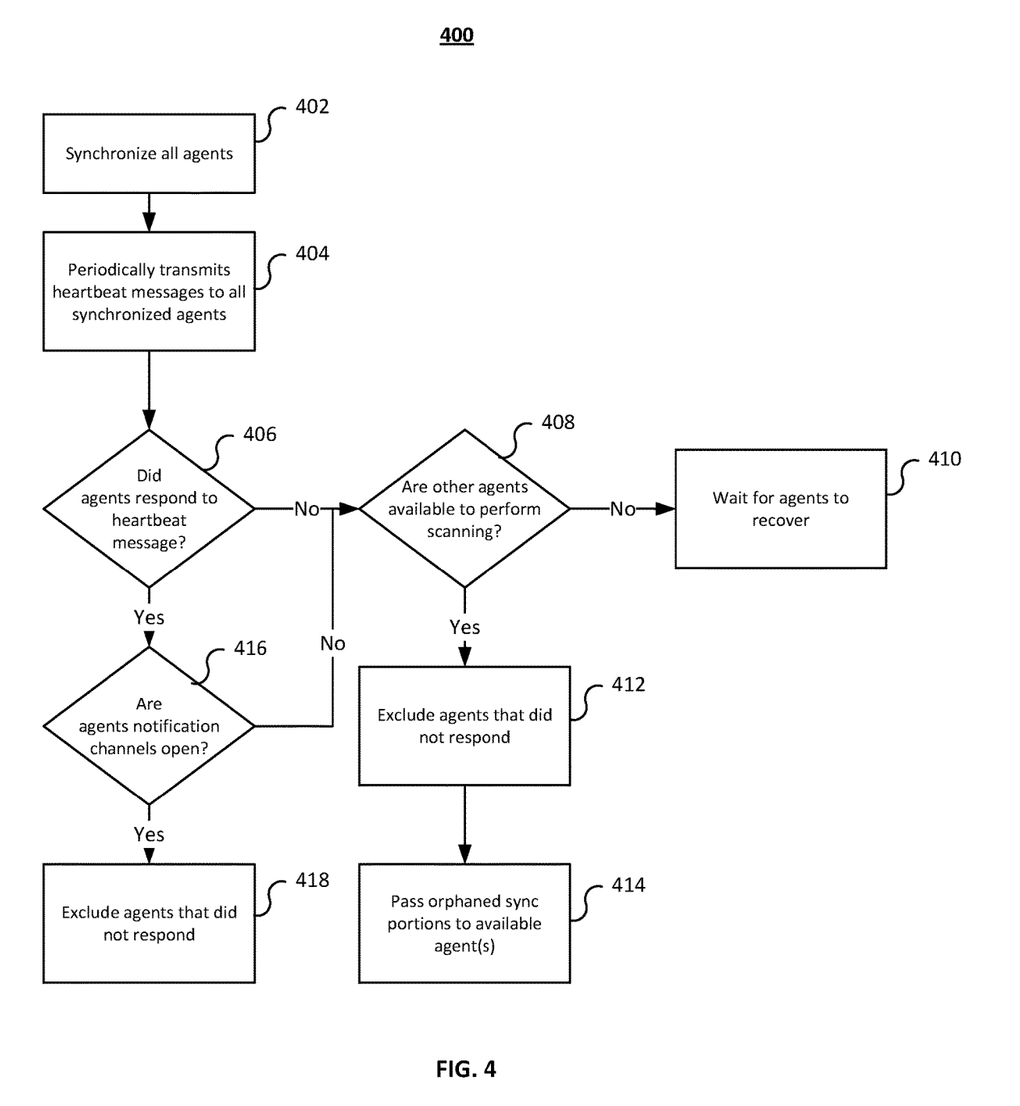
FIG. 4 illustrates a flow diagram of a method for performing a parallel scan for malware in a cloud environment.

FIG. 4 illustrates a flow diagram of method 400 for performing a parallel scan for malware in a cloud environment, in accordance with aspects of the present disclosure. At 402, server 102 synchronizes all agents (e.g., agents 104a-e). At 404, server 102 periodically transmits "heartbeat" messages to all synchronized agents (e.g., every few seconds). A heartbeat message may be a standard message sent over the HTTP connection requesting the status of the agent. At 406, server 102 determines whether an agent has responded to the heartbeat message.

In response to determining that an agent has not responded to the heartbeat message (e.g., agent 104e does not respond), server 102 determines whether to exclude the agent from the scan at 408. More specifically, server 102 determines whether other connected agents are available to perform scanning. In response to determining that no other agents are available to perform scanning, method 400 proceeds to 410, where server 102 takes no further actions and waits for the agent to recover. However, if at 408, server 102 determines that other connected agents are available (e.g., agents 104a-d), method 400 proceeds to 412, where the agent (e.g., agent 104e) is excluded from the synchronization and malware scan. At 414, server portions that are orphaned (i.e., were originally to be scanned by a particular agent) are assigned to an available agent that can perform scanning (e.g., agent 104a).

If at 406, server 102 determines that the agent has responded to the heartbeat message, method 400 proceeds to 416, where server 102 determines whether the push notification channel of the agent is still open. If the push notification channel is no longer open, the agent is excluded from the malware scan. However, if the push notification channel is open, at 418, server 102 waits for the agent to become idle. As discussed before, an "idle agent" is one that has finished scanning an assigned portion of the scan. The status of being idle is reported from the agent to server 102 along with the result set of the agent's work.

Figure 5:
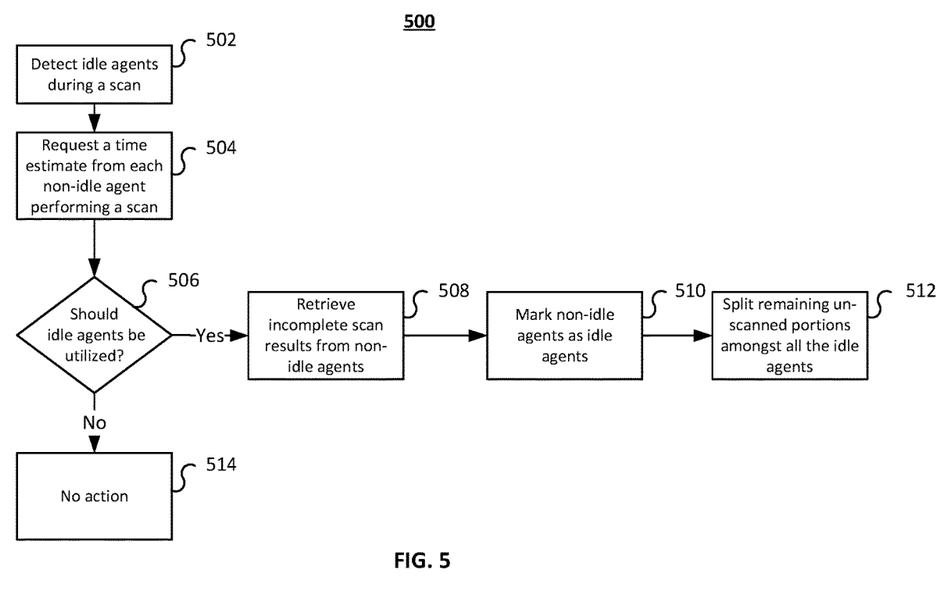
FIG. 5 illustrates a flow diagram of a method for utilizing idle agents.

FIG. 5 illustrates a flow diagram of a method for utilizing idle agents, in accordance with aspects of the present disclosure. At 502, server 102 may detect idle agents during a scan. At 504, server 102 may request a time estimate from each non-idle agent performing a scan. The time estimate may indicate the remaining time for completing scanning of an assigned portion of the respective non-idle agent. At 506, server 102 may determine whether the idle agents should be utilized. For example, server 102 may determine an expected time of completion for each portion based on historic completion times. The historic completion times may be stored in a database and may include the most recent completion times as well (e.g., the completion times of the idle agents in the current scan). In some aspects, server 102 averages the expected times of completion and compares the average with the time estimates provided by the non-idle agents.

In response to determining that the time estimates provided by the non-idle agents each exceed the average expected time of completion, method 500 proceeds to 508, where server 102 retrieves the incomplete scan results from the non-idle agents. At 510, server 102 marks the non-idle agents as idle agents. At 512, server 102 splits the remaining un-scanned portions amongst all the idle agents. In some aspects, these idle agents are exclusively the agents that were not previously performing a scan on the portions. In other aspects, these idle agents also include the non-idle agents performing the scan on the portions. However, if at 506, server 102 determines that the time estimates are each less than or equal to the average expected time of completion, method 500 proceeds to 514, where server 102 takes no further action and waits for scan results.

Figure 6:
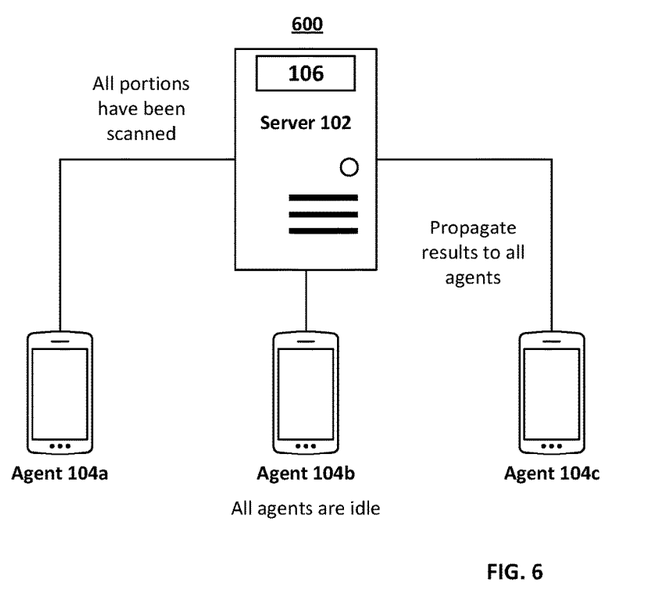
FIG. 6 illustrates a block diagram of a system post-scan.

FIG. 6 illustrates a block diagram of system 600 during a post-scan period, in accordance with aspects of the present disclosure. A scan is deemed successfully completed by server 102 if all portions of the content have been scanned and all agents are idle and have successfully reported their results. In FIG. 6, agents 104a-c have completed scanning and server 102 has received their results. The results are propagated to all agents 104a-c by server 102 upon successful completion. For example, the results from agent 104a are received at server 102, which further transmits the results to agents 104b and agents 104c. In some aspects, the results are propagated to all agents including agents 104d and 104e. In some aspects, server 102 combines the results received from each agent and distributes the combined results to each of the agents.

In some aspects, server 102 may determine from a respective scan result of an agent, a malware infection on the portion. Server 102 may remove the file associated with the malware from the portion and store the clean version of the portion in content 106. The clean version of content 106 on server 102 (i.e., without the malware) is then synchronized with all agents 104a-e by server 102. In some aspects, the old infected portions on each of the agents 104a-e are deleted.

FIG. 7 is a flow diagram illustrating method 700 for parallel malware scanning in a cloud environment. At 702, server 102 identifies a plurality of agents (e.g., agents 104a-e), wherein each agent of the plurality of agents is configured to synchronize data between a different computing device and server 102. At 704, server 102 receives, from a first agent of the plurality of agents (e.g., agent 104a), a request to scan an up-to-date version of the synchronized data for malware. For example, agent 104a may transmit a request to scan a directory comprising several files to server 102. At 706, server 102 determines, from the plurality of agents, at least one other agent that comprises the up-to-date version of the synchronized data. For example, agent 104b and agent 104c may also have an up-to-date version of the directory.

At 708, server 102 partitions the synchronized data into a plurality of portions. For example, the directory may include 30 files. In some aspects, server 102 may divide the directory based on the number of files (e.g., into portions of 10 unique files). In some aspects, server 102 may divide the directory based on size of the files (e.g., if the total size is 3 GB, the divide may 1 GB each).

At 710, server 102 assigns a first portion for scanning to the first agent and at least one other portion for scanning to the at least one other agent. In some aspects, the at least one other agent is simply a second agent, and the at least one other portion comprises a second portion and a third portion. Server 102 may assign the second portion for scanning to the second agent and determine which of the first agent and the second agent completes scanning first. Server 102 may then assign the third portion for scanning to the agent that has completed scanning their assigned portion first.

At 712, server 102 aggregates scan results from the first agent (e.g., agent 104a) and the at least one other agents (e.g., agents 104b and 104c). At 712, server 102 transmits the aggregated scan results to the plurality of agents (e.g., all agents with the directory stored).

Figure 8:
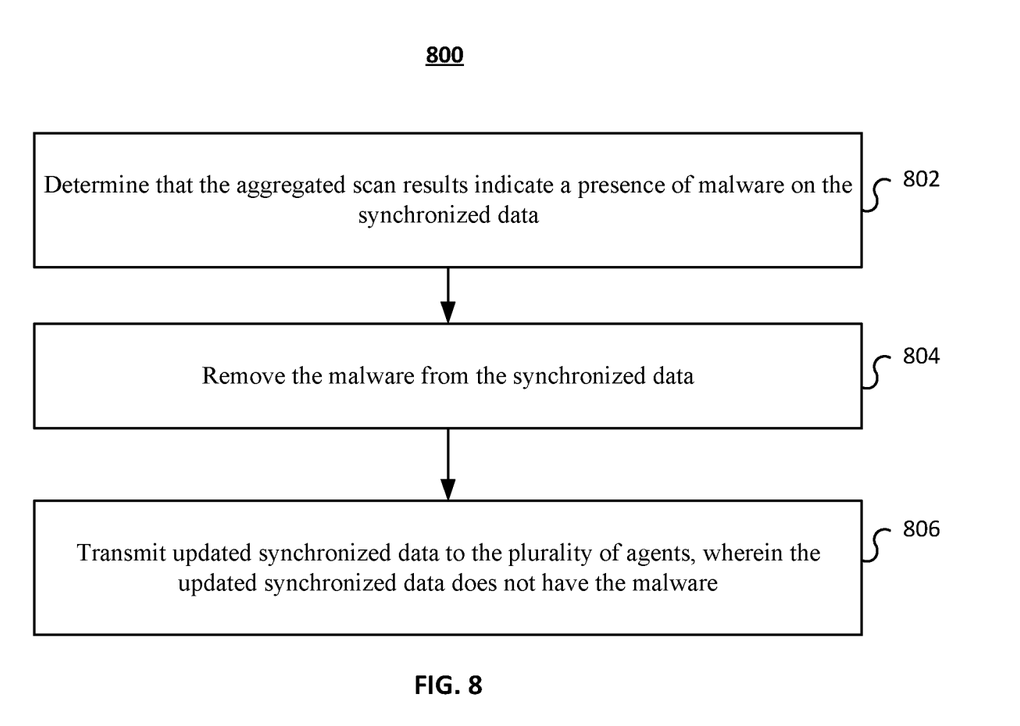
FIG. 8 is a flow diagram illustrating a method for removing malware from the server and the associated user devices.

FIG. 8 is a flow diagram illustrating method 800 for removing malware from server 102 and the associated user devices. At 802, server 102 determines that the aggregated scan results indicate a presence of malware on the synchronized data. At 804, server 102 removes the malware from the synchronized data. At 806, server 102 transmits updated synchronized data to the plurality of agents, wherein the updated synchronized data does not have the malware.

Figure 9:
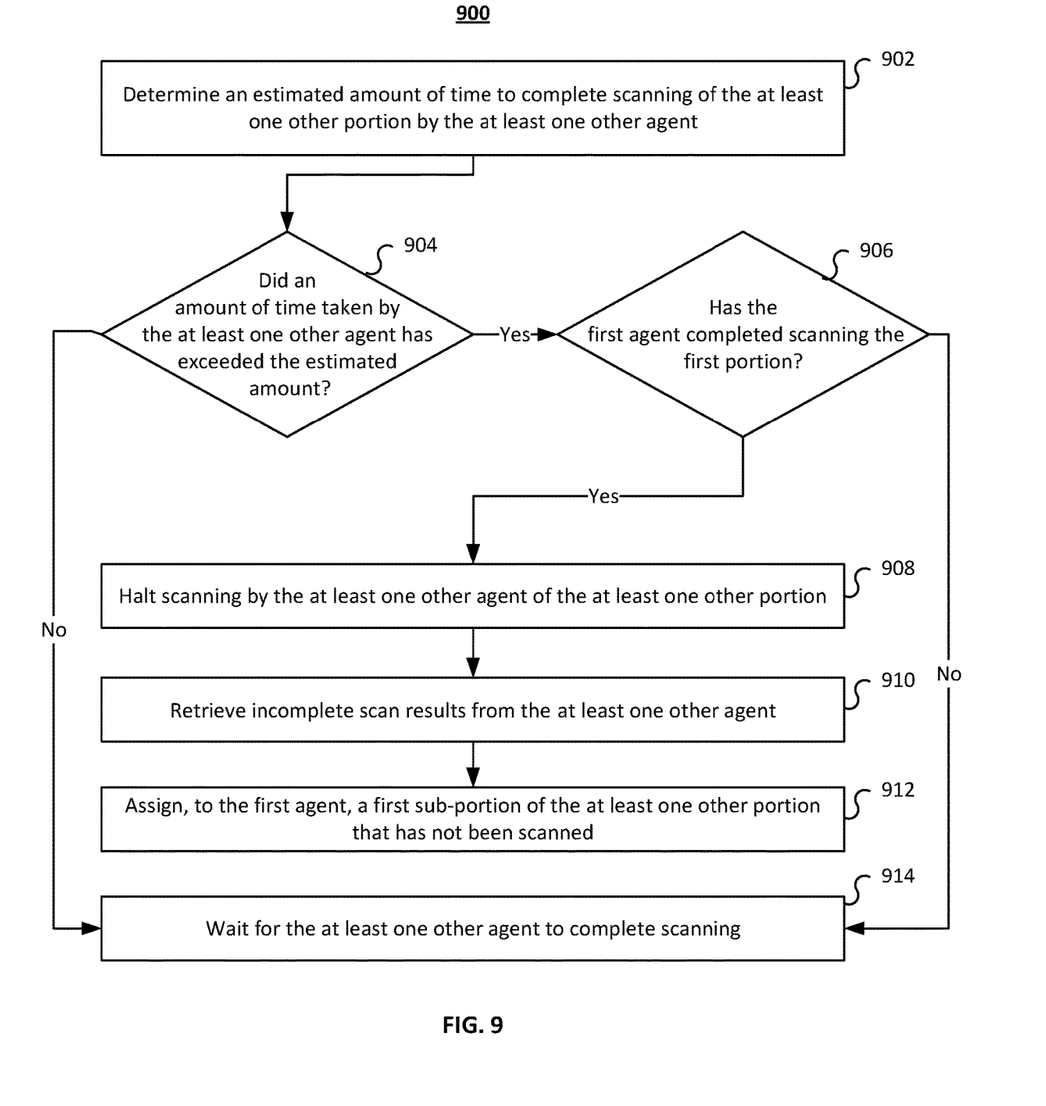
FIG. 9 is a flow diagram illustrating a method for decreasing the amount of time to perform parallel scanning.

FIG. 9 is a flow diagram illustrating method 900 for decreasing the amount of time to perform parallel scanning. At 902, server 102 determines an estimated amount of time to complete scanning of the at least one other portion by the at least one other agent. At 904, server 102 determines whether an amount of time taken by the at least one other agent has exceeded the estimated amount. In response to determining that the amount of time exceeds the estimated amount, method 900 proceeds to 906, where server 102 determines whether the first agent has completed scanning the first portion. In response to determining that the first agent has completed scanning, method 900 advances to 908, where server 102 halts scanning by the at least one other agent of the at least one other portion. At 910, server 102 retrieves incomplete scan results from the at least one other agent. At 912, server 102 assigns, to the first agent, a first sub-portion of the at least one other portion that has not been scanned. When the first agent has complete this additional scan of the at least one other portion, server 102 aggregates the results from the first agent with the incomplete scan results from the at least one other agent.

Figure 10:
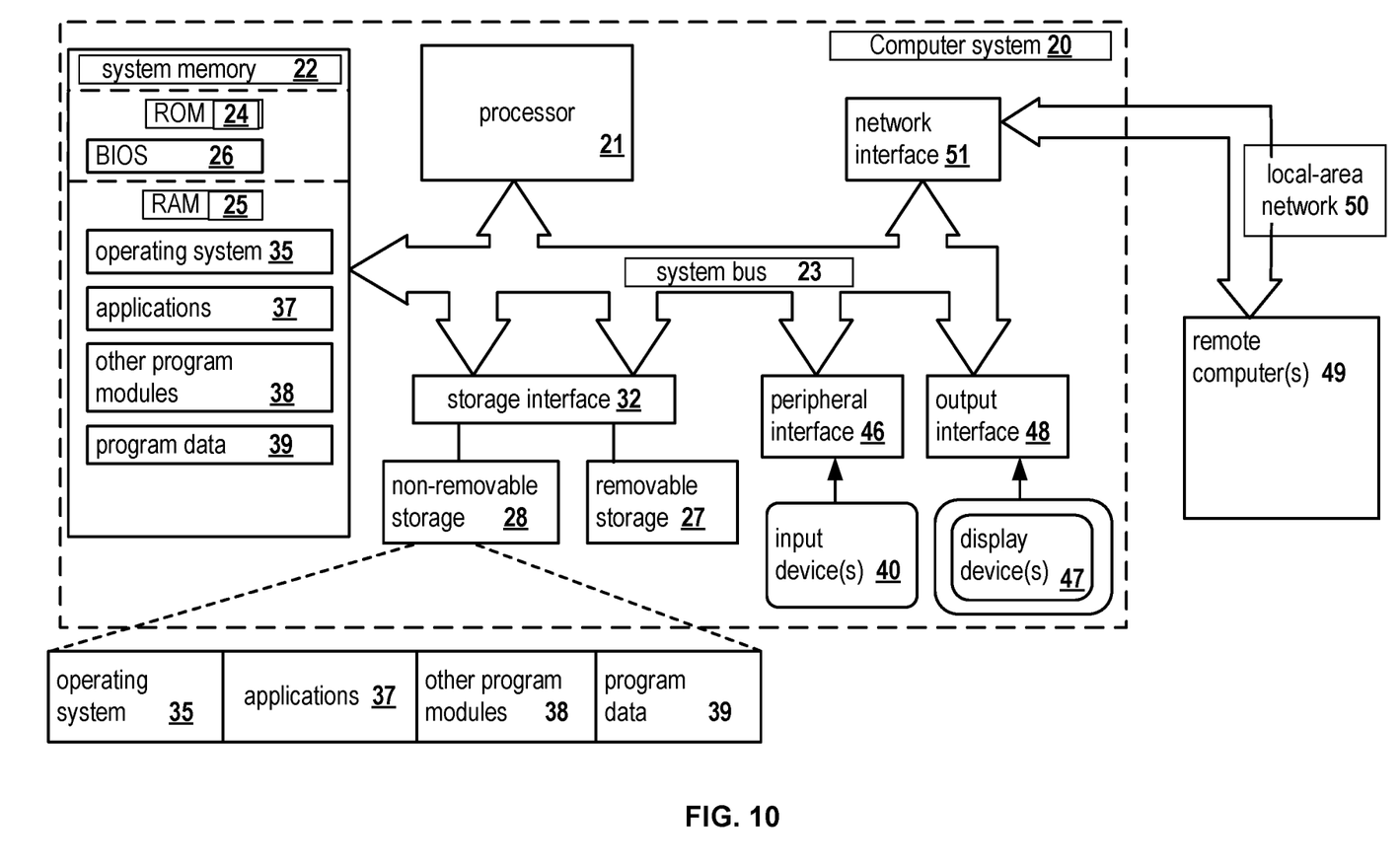
FIG. 10 presents an example of a general-purpose computer system on which aspects of the present disclosure can be implemented.

FIG. 10 is a block diagram illustrating a computer system 20 on which aspects of systems and methods for performing a parallel scan for malware in a cloud environment may be implemented in accordance with an exemplary aspect. The computer system 20 may represent server 102 and/or a user device comprising agent 104 and can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, PC, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of disclosed methods performed by server 102 may be executed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for parallel malware scanning in a cloud environment, the method comprising:
    identifying a plurality of agents connected to a server, wherein each agent of the plurality of agents is configured to synchronize data between a different computing device and the server;
    receiving, from a first agent of the plurality of agents, a request to scan an up-to-date version of the synchronized data for malware;
    receiving a status identifier from at least one other agent indicating that the at least one other agent has completed downloading or uploading the synchronized data;
    in response to determining, from the plurality of agents, that the at least one other agent comprises the up-to-date version of the synchronized data based on the status identifier, partitioning the synchronized data into a plurality of portions;
    assigning a first portion for scanning to the first agent and at least one other portion for scanning to the at least one other agent;
    aggregating scan results from the first agent and the at least one other agent; and
    transmitting the aggregated scan results to the plurality of agents.

2. The method of claim 1, further comprising:
    determining that the aggregated scan results indicate a presence of malware on the synchronized data;
    removing the malware from the synchronized data; and
    transmitting updated synchronized data to the plurality of agents, wherein the updated synchronized data does not have the malware.

3. The method of claim 1, wherein identifying the plurality of agents comprises:
    detecting requests from at least two agents to establish at least two push notification channels with the server, wherein each channel of the least two push notification channels is established by a respective agent of the at least two agents;
    storing identifiers of the at least two push notification channels and the at least two agents; and
    identifying the at least two agents as the plurality of agents.

4. The method of claim 1, wherein determining the at least one other agent that comprises the up-to-date version of the synchronized data comprises:
 determining a first plurality of checksums for files in the synchronized data on the server, wherein the server comprises the up-to-date version of the synchronized data;
 determining a second plurality of checksums for the files in the synchronized data on the at least one other agent;
 comparing the first plurality of checksums and the second plurality of checksums; and
 in response to determining a match between the first plurality of checksums and the second plurality of checksums based on the comparing, determining that the at least one other agent comprises the up-to-date version of the synchronized data.

5. The method of claim 1, wherein the at least one other agent comprises a second agent, and the at least one other portion comprises a second portion and a third portion, further comprising:
 assigning the second portion for scanning to the second agent;
 determining which of the first agent and the second agent completes scanning first;
 in response to determining that the first agent has completed scanning first, assigning the third portion for scanning to the first agent.

6. The method of claim 1, further comprising:
 determining an estimated amount of time to complete scanning of the at least one other portion by the at least one other agent;
 in response to determining that (1) an amount of time taken by the at least one other agent has exceeded the estimated amount and (2) the first agent has completed scanning the first portion:
  halting scanning by the at least one other agent of the at least one other portion;
  retrieving incomplete scan results from the at least one other agent; and
  assigning, to the first agent, a first sub-portion of the at least one other portion that has not been scanned.

7. The method of claim 6, further comprising:
 assigning, to a second agent of the at least one other agent, a second sub-portion of the at least one other portion that has not been scanned.

8. A system for parallel malware scanning in a cloud environment, the system comprising:
 a hardware processor configured to:
  identify a plurality of agents connected to a server, wherein each agent of the plurality of agents is configured to synchronize data between a different computing device and the server;
  receive, from a first agent of the plurality of agents, a request to scan an up-to-date version of the synchronized data for malware;
  receive a status identifier from at least one other agent indicating that the at least one other agent has completed downloading or uploading the synchronized data;
  in response to determining, from the plurality of agents, that the at least one other agent comprises the up-to-date version of the synchronized data based on the status identifier, partition the synchronized data into a plurality of portions;
  assign a first portion for scanning to the first agent and at least one other portion for scanning to the at least one other agent;
  aggregate scan results from the first agent and the at least one other agent; and
  transmit the aggregated scan results to the plurality of agents.

9. The system of claim 8, wherein the hardware processor is further configured to:
 determine that the aggregated scan results indicate a presence of malware on the synchronized data;
 remove the malware from the synchronized data; and
 transmit updated synchronized data to the plurality of agents, wherein the updated synchronized data does not have the malware.

10. The system of claim 8, wherein the hardware processor is further configured to identify the plurality of agents by:
 detecting requests from at least two agents to establish at least two push notification channels with the server, wherein each channel of the least two push notification channels is established by a respective agent of the at least two agents;
 storing identifiers of the at least two push notification channels and the at least two agents; and
 identifying the at least two agents as the plurality of agents.

11. The system of claim 8, wherein the hardware processor is further configured to determine the at least one other agent that comprises the up-to-date version of the synchronized data by:
 determining a first plurality of checksums for files in the synchronized data on the server, wherein the server comprises the up-to-date version of the synchronized data;
 determining a second plurality of checksums for the files in the synchronized data on the at least one other agent;
 comparing the first plurality of checksums and the second plurality of checksums; and
 in response to determining a match between the first plurality of checksums and the second plurality of checksums based on the comparing, determining that the at least one other agent comprises the up-to-date version of the synchronized data.

12. The system of claim 8, wherein the at least one other agent comprises a second agent, and the at least one other portion comprises a second portion and a third portion, wherein the hardware processor is further configured to:
 assign the second portion for scanning to the second agent;
 determine which of the first agent and the second agent completes scanning first;
 in response to determining that the first agent has completed scanning first, assign the third portion for scanning to the first agent.

13. The system of claim 8, wherein the hardware processor is further configured to:
 determine an estimated amount of time to complete scanning of the at least one other portion by the at least one other agent;
 in response to determining that (1) an amount of time taken by the at least one other agent has exceeded the estimated amount and (2) the first agent has completed scanning the first portion:
  halt scanning by the at least one other agent of the at least one other portion;
  retrieve incomplete scan results from the at least one other agent; and
  assign, to the first agent, a first sub-portion of the at least one other portion that has not been scanned.

14. The system of claim 13, wherein the hardware processor is further configured to:
assign, to a second agent of the at least one other agent, a second sub-portion of the at least one other portion that has not been scanned.

15. A non-transitory computer readable medium storing thereon computer executable instructions for parallel malware scanning in a cloud environment, including instructions for:
identifying a plurality of agents connected to a server, wherein each agent of the plurality of agents is configured to synchronize data between a different computing device and the server;
receiving, from a first agent of the plurality of agents, a request to scan an up-to-date version of the synchronized data for malware;
receiving a status identifier from at least one other agent indicating that the at least one other agent has completed downloading or uploading the synchronized data;
in response to determining, from the plurality of agents, that the at least one other agent comprises the up-to-date version of the synchronized data based on the status identifier, partitioning the synchronized data into a plurality of portions;
assigning a first portion for scanning to the first agent and at least one other portion for scanning to the at least one other agent;
aggregating scan results from the first agent and the at least one other agent; and
transmitting the aggregated scan results to the plurality of agents.

16. The non-transitory computer readable medium of claim 15, further comprising instructions for:
determining that the aggregated scan results indicate a presence of malware on the synchronized data;
removing the malware from the synchronized data; and
transmitting updated synchronized data to the plurality of agents, wherein the updated synchronized data does not have the malware.

17. The non-transitory computer readable medium of claim 15, wherein an instruction for identifying the plurality of agents further comprises instructions for:
detecting requests from at least two agents to establish at least two push notification channels with the server, wherein each channel of the least two push notification channels is established by a respective agent of the at least two agents;
storing identifiers of the at least two push notification channels and the at least two agents; and
identifying the at least two agents as the plurality of agents.

18. The non-transitory computer readable medium of claim 15, wherein an instruction for determining the at least one other agent that comprises the up-to-date version of the synchronized data further comprises instructions for:
determining a first plurality of checksums for files in the synchronized data on the server, wherein the server comprises the up-to-date version of the synchronized data;
determining a second plurality of checksums for the files in the synchronized data on the at least one other agent;
comparing the first plurality of checksums and the second plurality of checksums; and
in response to determining a match between the first plurality of checksums and the second plurality of checksums based on the comparing, determining that the at least one other agent comprises the up-to-date version of the synchronized data.

* * * * *